United States Patent [19]

Schiller et al.

[11] 4,435,727

[45] Mar. 6, 1984

[54] APPARATUS AND METHOD FOR USE IN CALIBRATING THE TIME AXIS AND INTENSITY LINEARITY OF A STREAK CAMERA

[75] Inventors: Norman H. Schiller, Queens; Robert R. Alfano, Bronx, both of N.Y.

[73] Assignee: Hamamatsu Corporation, Middlesex, N.J.

[21] Appl. No.: 382,803

[22] Filed: May 27, 1982

[51] Int. Cl.³ .............................................. H04N 7/18

[52] U.S. Cl. ....................................... 358/139; 358/93; 358/107

[58] Field of Search ................. 358/93, 107, 139, 209; 350/96.24

[56] References Cited

U.S. PATENT DOCUMENTS

| | | | |
|---|---|---|---|
| 3,827,075 | 7/1974 | Baycura | 358/41 |
| 3,892,468 | 7/1975 | Duguay | 358/200 |
| 3,925,727 | 12/1975 | Duguay | 350/96.24 |
| 4,037,922 | 7/1977 | Claypoole | 350/96.24 |
| 4,232,333 | 11/1980 | Hiruma | 358/93 |

*Primary Examiner*—Howard Britton

*Attorney, Agent, or Firm*—Irving M. Kriegsman

[57] ABSTRACT

Apparatus is disclosed for use in calibrating the time axis and intensity linearity of a streak camera or any optoelectronic device over any one of a number of different time scales. The apparatus includes a plurality of bundles of optical fibers mounted on a rotation wheel and a pulsed light source. Each bundle of optical fibers is made up of a plurality of optical fibers, each cut to a different length with the differences in length between the fibers in any one bundle being uniform and the differences in length of the fibers in one bundle being different from the differences in length of the fibers in each one of the other bundles. The fibers in each bundle are arranged so that one set of ends terminates in a common input plane and the other set of ends terminates in a common output plane. In using the apparatus, the rotation wheel is positioned so that a selected one of the bundles is located to receive the light pulse from the light source and transmit the light received into the slit of the streak camera. A light pulse entering the bundle from the input end emerges from the output end as a train of pulses of equal intensity, one from each fiber, separated in time from one another in accordance with the difference in lengths of the fibers. In an illustrative embodiment of the invention, the number of bundles of fibers on the rotation wheel is five, the number of fibers in each bundle is ten and the differences in length of the fibers in the different bundles are 1, 2, 4, 10 and 20 cm respectively. As a result, depending on which bundle is illuminated, ten pulses of equal intensity, each separated in time by 50, 100, 200, 500 and 100 picoseconds, respectively, are produced.

9 Claims, 5 Drawing Figures

APPARATUS AND METHOD FOR USE IN CALIBRATING THE TIME AXIS AND INTENSITY LINEARITY OF A STREAK CAMERA

BACKGROUND OF THE INVENTION

The present invention relates generally to a method and apparatus for calibrating a streak camera and more particularly to a method and apparatus for calibrating the time axis and intensity linearity of a streak camera over any one of a number of different time scales.

As is known, a streak camera measures light from an event as a function of time on the picosecond scale. The advent of picosecond light pulses, such as modelocked laser pulses and synchrotron radiation, created demand for reliable and compact high-speed streak cameras for temporally and spatially resolved studies of beam diagnostics, high-speed phenomena ensuing from picosecond excitation, and laser-induced plasmas.

The picosecond streak camera is indispensable in many areas of time-resolved studies in scientific research and engineering applications. Researchers in biology, chemistry and physics use the streak camera to measure the fluorescence and absorption kinetics of ultrafast light phenomena.

It is invaluable in the diagnostics of mode-locked and Q-switched laser pulses, pulse progagation studies and laser-plasma interactions, and can be used in the study of implosions in laser fusion experiments. The streak camera may facilitate laser pulse millimeter ranging of complicated and normally inaccessible structures. And, it is useful in diagnostics of high-energy particle beam interactions with matter and in nuclear explosion monitoring.

A streak camera relies on conversion of time information into spatial information. Photons striking the photocathode of the streak tube produce emission of electrons in proportion to the incident light intensity. The electrons are then accelerated into the streak tube via an accelerating mesh and are electrostatically swept at a known rate over a known distance, converting temporal information into spatial information.

These electrons then strike a microchannel plate capable of producing electron multiplication through secondary emission. The secondary electrons released at different times (in relation to the incident electrons) impinge upon a phosphor screen forming the streak image. The streaked luminous output formed on the phosphor screen is viewed by a film back or by an electronic video readout system, which interprets the information as time as a function of position. By viewing the entire luminous event, a streak camera "fingerprints" the time-resolved spectroscopic characteristics of a molecular system.

A discussion of streak camera systems may be found in an article by N. H. Schiller, Y. Tsuchiya, E. Inuzuka, Y. Suzuki, K. Kinoshita, K. Kamiya, H. Lida and R. R. Alfano appearing in the June, 1980, issue of Optical Spectra and an example of a streak camera system may be found in U.S. Pat. No. 4,232,333 to T. Hiruma et al. Other known prior art to the present invention includes U.S. Pat. No. 3,827,075, to O. M. Baycura; U.S. Pat. No. 3,892,468, to M. A. Duguay; U.S. Pat. No. 3,925,727, to M. A. Duguay; and U.S. Pat. No. 4,037,922, to S. A. Claypoole.

In the past, the time axis and intensity linearity of a streak camera has been calibrated by passing a single laser pulse (such as a 6 ps. 530 nm. pulse) through a pair of mirrors of transmission coefficient T (for each mirror) and separated by an air spacing of d. The calibrating pulses produced in this manner make up a train of pulses separated in a time $\Delta\gamma=2d/c$, where c is the velocity of light. The intensity profile of the train is a decaying exponential with each subsequent peak reduced by $(1-Y)^2$ For each round trip of the pulse between mirrors, a light pulse of intensity $I_k=I_o(1-Y)^{2k}$ is produced, for $k=0,1,2\ldots n$. Since $I_k/I_{k+1}=1/(1-Y)^2=\text{constant}$, the envelope formed by the peaks of the pulses follows a single exponential decay as $$I = I_o \exp\left(\frac{t}{\Delta\tau} \ln (1 - T)^2\right),$$

where the time between peaks $t=k\Delta\tau$. The peaks are used to calibrate the time axis and correct for the intensity variations. For a number of reasons, this technique has not proven to be entirely satisfactory or adequate.

Accordingly, it is an object of this invention to provide a new and improved technique for calibrating the time axis and intensity linearity of a streak camera.

SUMMARY OF THE INVENTION

Apparatus for use in calibrating the time axis and intensity linearity of a streak camera over at least one time scale. Said streak camera having an input slit, and said apparatus comprising a light means for producing a pulse of light. At least one bundle of optical fibers, each bundle of optical fibers comprising a plurality of optical fibers of different lengths with the difference in lengths of the fibers in each bundle being uniform. The difference in length of the fibers in one bundle being different from the difference in length of the fibers in each other bundle. The fibers in each bundle being arranged so that one end thereof terminates in an input plane adapted to be positioned to receive said light pulse and the other end thereof terminates in an output plane adapted to be positioned at the input slit of the streak camera plane. Means for supporting said bundles of fibers, whereby a pulse of light from said light means impinging on any one of said bundles at said input plane end will produce at the output plane end of said bundle a plurality of light pulses of equal intensity each delayed uniformly in time in proportion to the difference in length of the fibers The foregoing and other objects and advantages will appear from the description to follow. In the description, reference is made to the accompanying drawings which form a part thereof, and in which is shown, by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENT

As is known, light travels through an optical fiber at a velocity of about $2\times10^{10}$ cm/sec.

Figure 1:
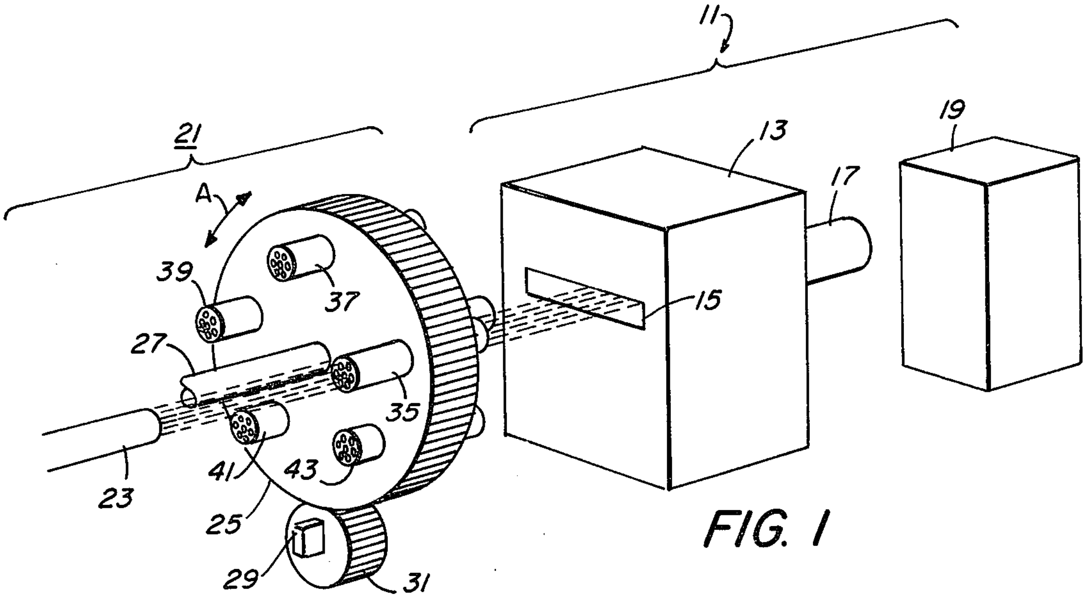
FIG. 1 is a schematic illustration of a streak camera system and an embodiment of an apparatus constructed according to the teachings of the present invention for calibrating the time axis and intensity linearity of the streak camera system.

Referring now to the drawings there is illustrated in FIG. 1 a streak camera system identified by reference numeral 11. Streak camera system 11 includes a streak camera 13 having an entrance slit 15 at the front end, a video camera 17 coupled to the output of the streak camera and a display 19. Also shown in FIG. 1 is an apparatus for use in calibrating the time axis and intensity linearity of the streak camera system 11, according to the teachings of this invention, the apparatus being designated generally by reference numeral 21.

Apparatus 21 comprises a pulsed light source 23, such as a laser, which produces a collimated pulse of light of known intensity and wave shape. Apparatus 21 further includes a rotation wheel 25 which is mounted on a shaft 27 for axial rotation in the direction of the arrows A. Shaft 27 is mounted on a suitable support member (not shown). Rotation wheel 25 is turned by rotating a knob 29 mounted on a disc 31 having teeth which mesh with the teeth on the rotation wheel. Disc 31 is mounted on an axial shaft 33 which is mounted on suitable support members (not shown).

A plurality of bundles of optical fibers, designated by reference numerals 35,37,39,41 and 43 are mounted on rotation wheel 25. Each bundle is constructed for use in calibrating the streak camera 13 for a different time scale.

Figure 2:
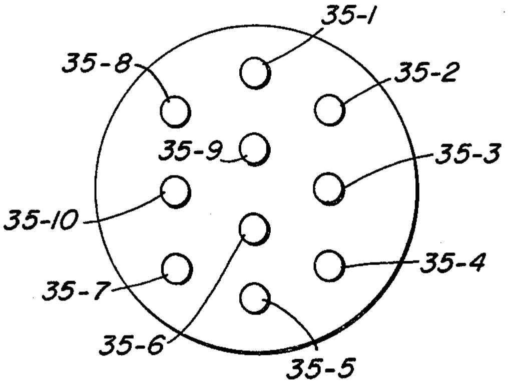
FIG. 2 is an enlarged front view of one of the fiber bundles shown in the apparatus in FIG. 1 (unit 35 as example)

Bundle 35 which is constructed for use in calibrating streak camera 13 for a time scale of 0 to 1 nanoseconds and which is also illustrated in FIGS. 2–5 is made up of ten optical fibers labelled 35-1 through 35-10. The fibers are encapsulated in a cylindrically shaped body 35-11 of suitable encapsulating material. Each fiber is cut to a different length with the difference in length between any one fiber and the next largest fiber (in length) being one centimeter. For example, fibers 35-1 through 35-10 as shown in FIG. 2 may be 5,6,7,8,9,10,11,12,13 and 14 centimeters (in length), respectfully. In addition, the fibers 35-1 through 35-10 are arranged within body 35-11 so that they terminate at the front or input end in a common plane A and at the rear or exit end in a common plane B.

Figure 4:
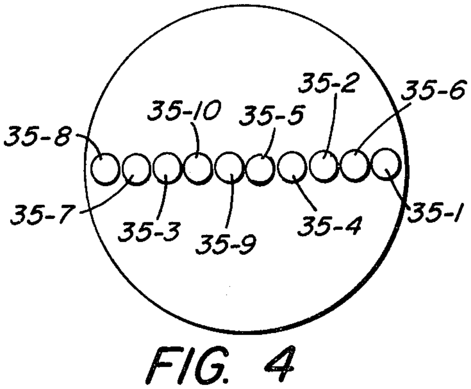
FIG. 4 is an enlarged back view of the fiber bundle of FIG. 2.
Figure 3:
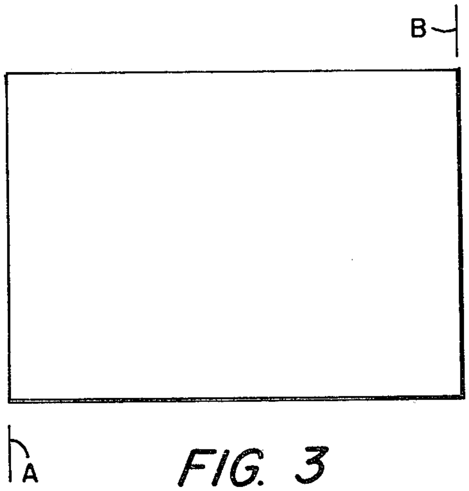
FIG. 3 is an enlarged side view of the fiber bundle shown in FIG. 3.
Figure 5:
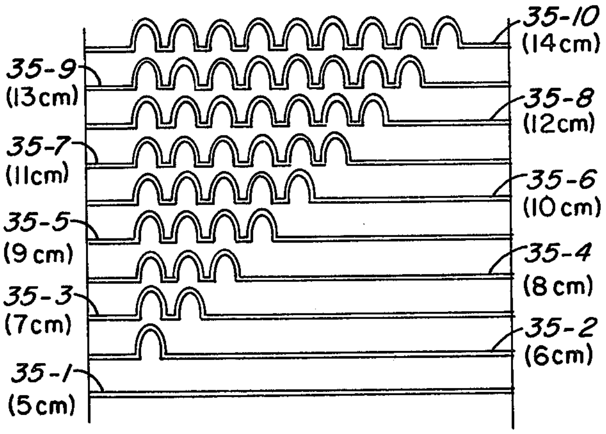
FIG. 5 is an enlarged illustration showing the relative sizes of the individual fibers in the bundle shown in FIGS. 2 through 4.

Because each fiber 35-1 through 35-10 in bundle 35 differs in length from the next largest fiber and differs by the same amount i.e. one centimeter, a single pulse entering all of the fibers at the input end (at the same time) will pass through each fiber and form a train of ten pulses at the output end (one from each fiber) of equal intensity, each pulse being separated (delayed) from the next pulse on the train by an equal amount of time i.e. 50 picoseconds. Thus, ten pulses will be produced each separated by 50 picoseconds. The cross-sectional size of bundle 35 is no greater than the cross-sectional size than the collimated beam of light from source 23 so that the light pulse from source 23 will impinge on all of the fibers at the input phase A. Fibers 35-1 through 35-10 are randomly arranged at the input end, as shown in FIG. 2. The fibers are preferably arranged in a horizontal row at the output end as shown in FIG. 4 so that the light transmitted out from each fiber can be passed into the slit 15 of camera 13 without using additional focussing or collecting optics.

Bundles 37, 39, 41 and 43 are also made up of ten fibers, each encapsulated in a suitable encapsulating medium and arranged at one end so as to have a common input plane and at the other end so as to have a common output plane. However, the difference in length of the individual fibers in each bundle is different. In bundle 37, the individual fibers differ in length by two centimeters with the smallest fiber being for example 5 cm. so as to produce a pulse train of ten pulses of equal intensity being separated from one another by 100 picoseconds for use in calibrating the streak camera 15 over a time scale of 1 nanosecond. In bundles 39, 41 and 43 the difference in length of the individual fibers is 4,10 and 20 cm. respectfully producing time delays in the trains of pulses of 200, 500 and 1,000 picoseconds respectfully and thus usuable for calibration purposes over time scales of 2,5 and 10 nanoseconds respectfully.

As can be appreciated the particular number of bundles of fibers and the particular number of fibers in each bundle and the length differences of the individual fibers in each bundle may be increased or decreased if desired, depending on the number of different time scales desired and the particular number of (uniformly) spaced pulses desired over each time scale.

In using the apparatus the rotation wheel 25 is turned until the bundle 35 producing the desired time scale is positioned between the light source 23 and the slit 15 of streak camera 13. The input end of the bundle is then illuminated with the light pulse.

One advantage of the invention is that the pulses produced through any one bundle are of equal intensity. Another advantage of the invention is that the time scale of the train of pulses can be easily changed by simply turning the rotation wheel 25 so that the bundle producing the desired time scale is optically aligned with the light source 23.

What is claimed is:

1. Apparatus for use in calibrating the time axis and intensity linearity of a streak camera over at least one time scale, said streak camera having an input slit, said apparatus comprising:
   a. light means for producing a pulse of light,
   b. at least one bundle of optical fibers, each bundle of optical fibers comprising a plurality of optical fibers of different lengths with the difference in lengths of the fibers in each bundle being uniform, the difference in length of the fibers in one bundle being different from the difference in length of the fibers in each other bundle, the fibers in each bundle being arranged so that one end thereof terminates in an input plane adapted to be positioned to receive said light pulse and the other end thereof terminates in an output plane adapted to be positioned at the input slit of the streak camera, and
   c. means for supporting said bundles of fibers, d. whereby a pulse of light from said light means impinging on any one of said bundles at said input plane end will produce at the output plane end of said bundle a plurality of light pulses of equal intensity each delayed uniformly in time in proportion to the difference in length of the fibers.

2. The apparatus of claim 1 and wherein the difference in lengths of the fibers in said bundle is one centimeter.

3. The apparatus of claim 1 and wherein said number of bundles is one.

4. The apparatus of claim 3 and wherein said bundle comprises ten optical fibers.

5. The apparatus of claim 1 and wherein said number of bundles is five.

6. The apparatus of claim 1 and wherein said light means comprises a pulsed laser.

7. The apparatus of claim and 1 and wherein means for supporting said bundles of fibers comprises a rotation wheel.

8. A method of calibrating the time axis and intensity linearity of a streak camera over a defined time scale:

a. generating a train of light pulses of equal intensity and uniformly spaced from one another over said time scale, and b. directing said train of pulses into said streak camera.

9. The method of claim 8 and wherein generating said train of pulses comprises:

a. providing a bundle of optical of uniformly different lengths and arranged so that one end of each fiber is terminated in a common output plane, and b. directing a pulse of light into the end of each fiber in the input plane at the same time.

* * * * *